Feb. 18, 1930.    B. M. SCHAUMAN    1,747,184
LIQUID HEATER
Original Filed Feb. 15, 1927    2 Sheets-Sheet 1
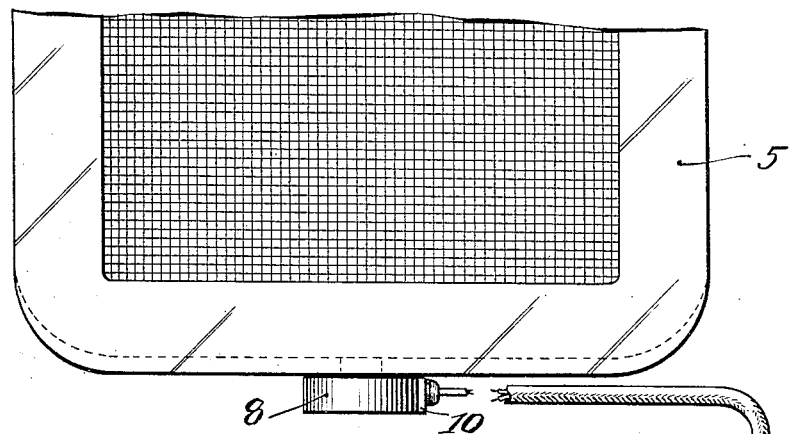
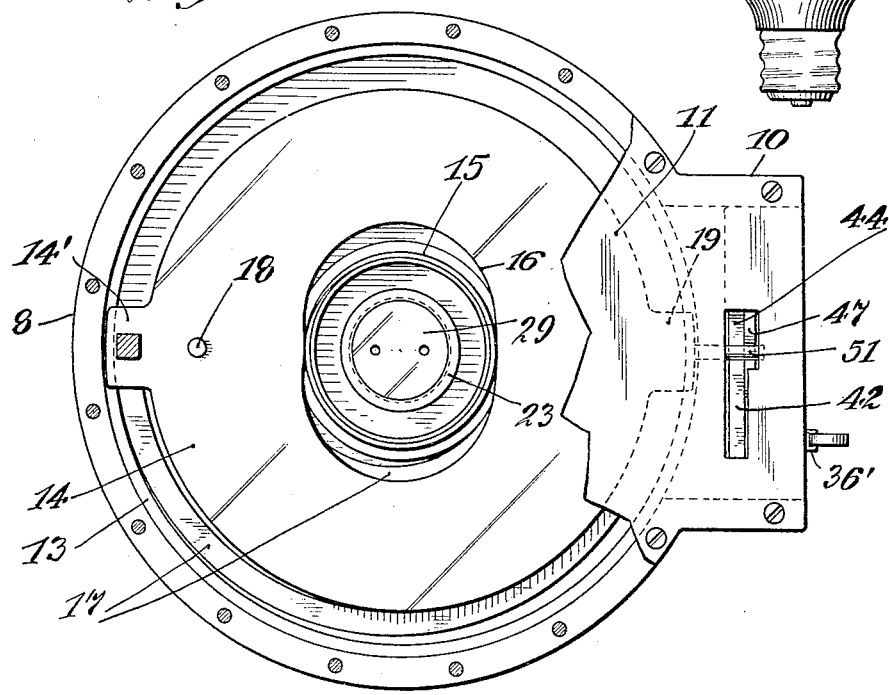
INVENTOR
Bror Max Schauman
BY C. P. Goepel
his ATTORNEY

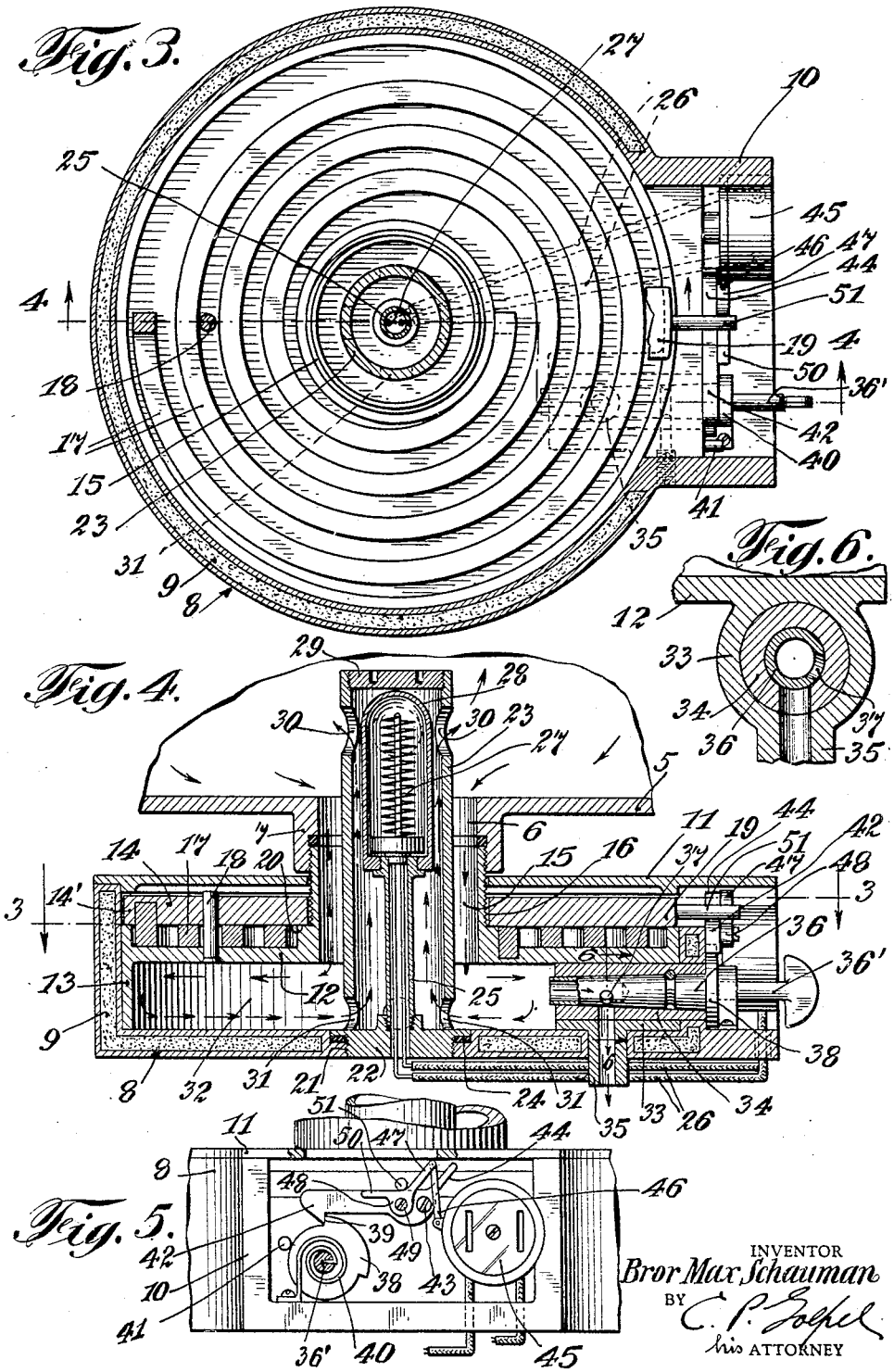

Patented Feb. 18, 1930

1,747,184

UNITED STATES PATENT OFFICE

BRÖR MAX SCHAUMAN, OF NEW YORK, N. Y., ASSIGNOR OF ONE-HALF TO MARGARET WOOLMAN CANTWELL, OF NEW YORK, N. Y.

LIQUID HEATER

Application filed February 15, 1927, Serial No. 168,251. Renewed July 5, 1929.

This invention relates to liquid heaters and broadly considered has for its primary object to provide means of simple construction and efficient and reliable in its operation whereby a liquid may be maintained substantially at a desired predetermined temperature.

It is a more particular object of the invention to provide a liquid heating device primarily designed for application to the radiators of automobiles whereby when the engine is not being operated, the cooling liquid or water may be heated and the temperature thereof maintained above the freezing point.

In one practical embodiment of the invention, I provide an electrical heating unit adapted to be disposed within the lower end of the radiator and a current supply control switch therefor in combination with a thermo-responsive element subject to variations in temperature of the water and a switch operating member operatively connected with said element and adapted to automatically close the switch for said heating unit when the temperature of the water approaches the freezing point.

It is also a further object of the invention to provide additional means controlled by said switch operating member whereby the radiator drain cock is opened in the event that for any reason the circuit for the heating unit is disconnected, thus draining the water from the radiator and preventing damage thereto by freezing.

With the above and other objects in view, the invention consists in the improved liquid heating device, and in the form, construction and relative arrangement of its several parts as will be hereinafter more fully described, illustrated in the accompanying drawings and subsequently incorporated in the subjoined claims.

In the drawings, wherein I have illustrated one simple and practical embodiment of the invention, and in which similar reference characters designate corresponding parts throughout the several views,—

Figure 1 is a front elevation of the lower portion of an automobile radiator having my invention applied thereto;

Fig. 2 is a top plan view, a part of the cover plate being broken away;

Fig. 3 is a horizontal sectional view taken substantially on the line 3—3 of Fig. 4;

Fig. 4 is a vertical section taken substantially on the line 4—4 of Fig. 3;

Fig. 5 is a detail elevation showing the control means for the current supply switch and drain cock, and Fig. 6 is a detail section on an enlarged scale taken on the line 6—6 of Fig. 4.

In the drawings, for purposes of illustration, I have shown a part of an automobile radiator 5 which may be of conventional form. The bottom wall of the water chamber of the radiator is provided with the usual outlet opening 6 which extends through the neck or boss 7 which receives a removable closure plug.

My invention as herein shown includes a double walled casing generally indicated at 8 between the spaced walls of which a suitable insulating material 9 is contained. This casing at one side thereof is provided with a rectangular lateral extension 10. The open top of this casing is adapted to be closed by a suitable cover plate 11.

Within the casing 8 and fitting in close contact with the side wall thereof, a member 12 is positioned. This member includes a disc or plate integrally formed at its outer edge with the cylindrical wall 13, one end of which engages the bottom wall of the casing 8, the other end portion of said cylindrical wall projecting above the upper surface of the plate or disc and constituting a supporting seat upon which the oscillatable plate 14 is positioned. The member 12 is centrally provided with an opening therein surrounded by an upstanding externally threaded boss 15 which projects upwardly through an elongated opening 16 in the plate 14 and through an opening centrally formed in the cover plate 11. The upper end of this boss is adapted to be detachably threaded within the outlet neck 7 on the bottom wall of the radiator 5.

Between the plate 14 and the plate or disc of the member 12, a thermo-responsive element 17 is positioned. As herein shown, this element is in the form of a spiral metal coil, one end of which is suitably fixed to the radially projecting lug 14' of the plate 14 while the other or inner end of said metal coil is suitably fixed to the member 12. The plate 14 is pivotally engaged for oscillatory motion upon the upper end of a pin or stud 18 fixed to the member 12. The plate 14 is also formed in diametrically opposed relation to the lug 14' with a second radially projecting lug 19. These lugs 14' and 19 are movably engaged upon the upper edge of the cylindrical wall 13, said plate being also supported at opposite sides of the opening 16 therein upon an annular shoulder 20 formed on the upstanding boss 15 of the member 12.

The bottom wall of the casing 8 is centrally provided with a threaded opening 21 therein to receive the threaded stem or plug 22 on the lower end of a metal tube 23 which is concentrically positioned through the boss 15 and projects above the same to extend into the water chamber of the radiator 5. A suitable packing ring or gasket 24 surrounds the threaded plug 22 and provides a water tight closure of the opening 21.

A tubular stem 25 of relatively small diameter has a detachable threaded connection at one of its ends with the plug 22 and the bore of the tube is in communication with a central opening in said plug and receives the circuit wire connections 26 of the current supply circuit for the electrical resistance unit shown at 27 mounted upon the upper end of the tube 25. This resistance unit is enclosed within an elongated casing 28 detachably threaded on the upper end of the tube 25 and formed from metal or other material of high heat conductivity.

The upper end of the tube 23 is closed by a suitable plug 29 and the wall of this tube at its upper end is provided with a series of circumferentially spaced openings 30. Said tube wall at its lower end is also provided with the spaced openings 31. Thus, it will be understood that there is free communication between this tube and the water chamber of the radiator 5 and the chamber 32 formed between the bottom wall of the casing 8 and the plate or disc of the member 12, the heated water rising through said tube and the openings 30 while the relatively cold water descends exteriorly of the tube 23 through the boss 15 and enters said tube through the lower openings 31, thus providing for the circulation of the water in the manner indicated by the arrows in Fig. 4 of the drawing.

The member 12 is also formed at one side thereof with a horizontally disposed tubular part 33 which receives a bushing 34, said tubular part having a downwardly projecting outlet nipple 35 extending through an opening in the bottom wall of the casing 8 and with which an opening in the wall of the bushing 34 registers. This bushing receives the rotary drain cock 36 having a tubular inner end portion communicating with the chamber 32 and provided in its wall with an opening 37.

The outer end of the drain cock 36 is formed with a flange 38 having an angular shoulder 39 and is provided with a longitudinally projecting stem 36' terminating in a suitable finger piece whereby the drain cock may be rotated against the action of a suitable spring 40 which normally holds said drain cock 36 in position with the opening 37 in registering relation with the opening through the outlet neck 35. A stop pin 41 adapted to be engaged by the shoulder 39 limits the rotation of the drain cock to this normal position. The drain cock is adapted to be held in its closed position shown in Figs. 4 and 5 of the drawings by a latch lever 42 pivotally mounted at one end as at 43 and engaging the shoulder 39 at its other end. The pivoted end of this latch lever is provided with an angularly extending finger 44.

A suitable type of socket switch indicated at 45 is mounted in the lateral extension 10 on the casing 8 and the movable element of this switch is connected by the link 46 to an angularly projecting arm 47 on one side of the pivot 49 of a member 48 which is mounted upon the detent or latch lever 42. This member also has a second arm 50 extending upon the opposite side of its pivot 49.

The latch lever 42 and the member 48 are adapted to be actuated by a pin 51 projecting laterally from the lug 19 of the oscillating plate 14.

Assuming that the device has been applied to the radiator of the automobile in the manner illustrated in the drawings, if the temperature of the atmosphere is appreciably below the freezing point so that there would be liability of the water contained in the radiator freezing and thus bursting and damaging the radiator core, the plug connected with the wiring of the garage is inserted in the socket of the switch 45 so that when the temperature of the water in the radiator decreases to a predetermined degree, say 35°, the thermo-responsive element 17 is influenced thereby and gradually contracts, thus oscillating the plate 14 in one direction. The pin 51, will first ride upon the upwardly extending arm 47 of the member 48 as will be seen from reference to Fig. 5 of the drawings and through the link connection 46 will close the switch 45. Thus, current is supplied to the electrical heating unit 27 so that the water within the tube 25 quickly becomes heated and ascends therethrough into the chamber of the radiator, and a circulation of the water is set up as indicated by the arrows in Fig. 4 until all of the water becomes heated to a uniform temperature. If, through oversight, the plug is not inserted to supply the electric circuit for the heating element 27 or the circuit becomes broken, then upon a further decrease in temperature of the water and a further contraction of the thermo-responsive element, the movement of the plate 14 will continue so as to cause the pin 51 to ride upon the inclined arm 44 of the latch element 42, thus disengaging the latch element from the shoulder 39 permitting the spring 40 to act and rotate the drain cock 36 to its open position, thus completely draining the water from the radiator and obviating the possibility of freezing. It will of course, be understood that if desired, the current for the electrical heating element 27 may be supplied from the batteries carried by the vehicle or other supplemental source of current supply so that the device may be made operative independently of the garage wiring system.

From the foregoing description considered in connection with the accompanying drawings, the construction, manner of application and several advantages of my improved liquid heater will be clearly and fully understood. While the device is primarily designed and intended for use in connection with radiators of motor vehicles, it will be apparent that the essential features thereof might also be incorporated in numerous alternatives of the present disclosure and made applicable to various other uses or purposes. Of course, as soon as the water is heated by the electrical heating element to a certain degree sufficient to influence the thermo-responsive element 17 and expand the same, the pin 51 will engage the other arm 50 of the member 48 and again open the current supply switch. Thus, the possible variations in temperature of the water is automatically maintained within certain definite limits.

The mounting and arrangement of the several elements comprising the device as above explained, enables access to be easily had to the several parts for the purpose of cleaning or repair. However, the specific form of the elements employed and their mounting and arrangement with respect to each other might be considerably varied without departing from the fundamental features of the disclosure. Accordingly, it is to be understood that I reserve the privilege of resorting to all such legitimate modifications of the several structural parts of my invention as may fairly be considered within the spirit and scope of the appended claims.

I claim:

1. In a liquid heating device, a thermo-responsive element influenced by variations in temperature of the liquid, a drain cock, a detent therefor, and means connected with said thermo-responsive element to actuate said detent and enable said drain cock to be opened.

2. In a liquid heating device, a thermo-responsive element influenced by variations in temperature of the liquid, a drain cock, a detent therefor, one end of said thermo-responsive element being fixed, an oscillatable member to which the other end of the thermo-responsive element is connected, and a part carried by said member cooperating with the detent to actuate the latter and permit the opening of the drain cock.

3. In a liquid heating device, a liquid receiving chamber, an electrical heating unit for the liquid, a current supply circuit for said unit and a switch in said circuit, a thermo-responsive element influenced by changes in temperature of the liquid in said chamber, means operatively connected to said element for opening and closing said switch, and additional means rendered operative by a part of said last named means to drain the liquid from said chamber.

4. In a liquid heating device, a liquid receiving chamber, an electrical heating unit for the liquid, a current supply circuit for said unit and a switch in said circuit, a thermo-responsive element influenced by changes in temperature of the liquid in said chamber, means operatively connected to said element for opening and closing said switch, said means including an oscillatable member, a rotary drain cock for said chamber, a spring for rotating said drain cock in one direction to open position, and a pivoted latch member for holding said drain cock in its closed position actuated by said oscillatable member in its movement in one direction to release the drain cock for movement to open position and thereby drain the liquid from said chamber.

5. In a liquid heating device having means for providing a chamber, said device including a casing for receiving liquid from the chamber, a thermo-responsive element influenced by variations in temperature of the liquid in said chamber, an electrical heating unit extending through said casing and into the chamber, a circuit for said heating unit and a switch in said circuit, and an oscillatable member for opening and closing said switch operatively connected to said thermo-responsive element.

6. In a liquid heating device having means for providing a chamber, said device including a casing for receiving liquid from the chamber, a thermo-responsive element influenced by variations in temperature of the liquid in said chamber, an electrical heating unit extending through said casing and into the chamber, a circuit for said heating unit and a switch in said circuit, an oscillatable member for opening and closing said switch operatively connected to said thermo-responsive element, a rotary drain cock for said chamber, a spring normally holding the same in open position, and means for latching said drain cock in its closed position against the action of said spring, said oscillatable member having a part cooperating with the latching means to actuate the latter and permit movement of the drain cock to open position upon a further movement of said oscillating member after the switch has been closed.

7. In a heating device having means for providing a chamber for liquid, said device including a casing, an electrical heating unit extending into the chamber, a circuit for said heating unit and a switch in said circuit, a spirally coiled thermo-responsive element influenced by changes in temperature of the liquid in said casing and fixed at one of its ends to one of the casing walls, a pivotally mounted oscillatable plate connected with the other end of said element and actuated thereby, and means operated by said plate in its oscillating movement to open and close said switch.

8. In a heating device having means for providing a liquid chamber, said device including a casing, an electrical heating unit extending into the chamber, a circuit for said heating unit and a switch in said circuit, a spirally coiled thermo-responsive element influenced by changes in temperature of the liquid in said casing and fixed at one of its ends to one of the casing walls, a pivotally mounted oscillatable plate connected with the other end of said element and actuated thereby, means operated by said plate in its oscillating movement to open and close said switch, a drain cock for said casing, means normally holding the same in open position, and latch means for retaining the drain cock in closed position actuated by said oscillatable plate in its movement in one direction after the switch has been closed upon a continued decrease in temperature of the liquid whereby said drain cock is moved to its open position to drain the liquid from the chamber.

9. In a liquid heating device, the combination of a liquid receiving chamber, a passageway for admitting liquid into said chamber, an electric heating unit, a current supply circuit for said unit, a switch in said circuit, a valve for effecting the drainage of fluid from said chamber, and mechanism including a thermostat automatically operative when the temperature of the fluid in the chamber falls below a predetermined degree, to close the switch, and when the temperature of the fluid drops below said predetermined degree to a second predetermined degrees, to open the valve, permitting the fluid in the chamber to escape.

In testimony that I claim the foregoing as my invention, I have signed my name hereto.

BROR MAX SCHAUMAN.